United States Patent
Ding et al.

(10) Patent No.: US 6,173,880 B1
(45) Date of Patent: Jan. 16, 2001

(54) FRICTION STIR WELD SYSTEM FOR WELDING AND WELD REPAIR

(75) Inventors: R. Jeffrey Ding, Athens; Peter L. Romine, Toney; Peter A. Oelgoetz, Huntsville, all of AL (US)

(73) Assignee: The United States of America as represented by the Administrator of the National Aeronautics and Space Administration, Washington, DC (US)

(*) Notice: Under 35 U.S.C. 154(b), the term of this patent shall be extended for 0 days.

(21) Appl. No.: 09/459,388

(22) Filed: Dec. 8, 1999

Related U.S. Application Data

(60) Provisional application No. 60/111,418, filed on Dec. 8, 1998.

(51) Int. Cl.[7] .................... B23K 20/08; B23K 20/12; B23K 37/02; B23K 5/00; B23K 1/00
(52) U.S. Cl. .................... 228/2.1; 228/2.3; 228/45; 228/25; 156/73.5
(58) Field of Search .................... 228/2.1, 2.3, 102, 228/103, 112.1, 114.5, 45; 156/73.5, 580

(56) References Cited

U.S. PATENT DOCUMENTS

| | | | |
|---|---|---|---|
| 3,819,339 | * | 6/1974 | Takagi et al. . |
| 4,122,990 | * | 10/1978 | Tasaki et al. . |
| 4,144,110 | * | 3/1979 | Luc . |
| 5,527,400 | * | 6/1996 | Smith et al. . |
| 5,697,544 | * | 12/1997 | Wykes . |
| 5,713,507 | * | 2/1998 | Holt et al. . |
| 5,718,366 | * | 2/1998 | Colligan . |
| 5,758,999 | * | 6/1998 | Geise . |
| 5,971,247 | * | 10/1999 | Gentry . |
| 6,019,013 | * | 2/2000 | Luik . |

FOREIGN PATENT DOCUMENTS

WO 98/13167 * 4/1998 (SE) .

* cited by examiner

*Primary Examiner*—Patrick Ryan
*Assistant Examiner*—Colleen Cooke
(74) *Attorney, Agent, or Firm*—James J. McGroary

(57) ABSTRACT

A friction stir weld system for welding and weld repair has a base foundation unit connected to a hydraulically controlled elevation platform and a hydraulically adjustable pin tool. The base foundation unit may be fixably connected to a horizontal surface or may be connected to a mobile support in order to provide mobility to the friction stir welding system. The elevation platform may be utilized to raise and lower the adjustable pin tool about a particular axis. Additional components which may be necessary for the friction stir welding process include back plate tooling, fixturing and/or a roller mechanism.

15 Claims, 1 Drawing Sheet

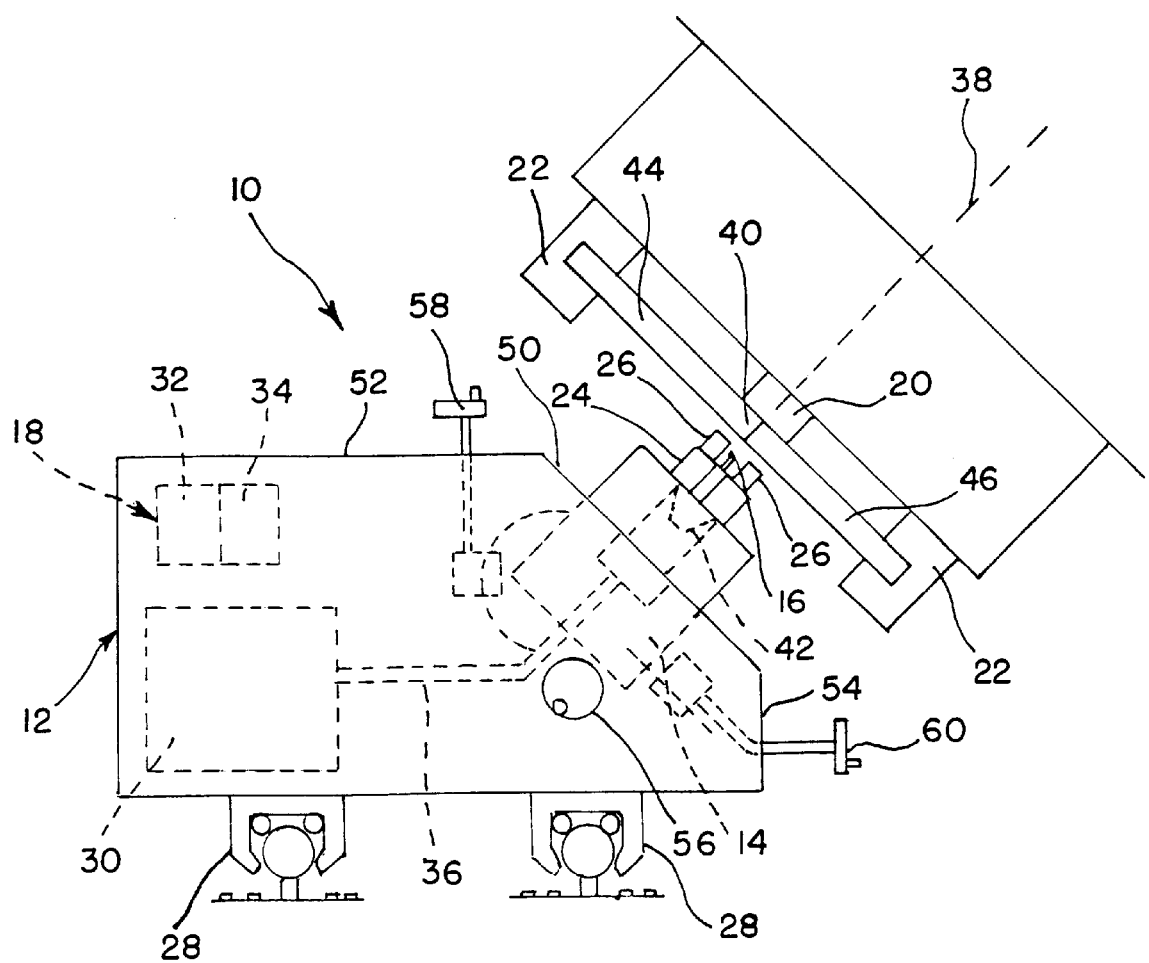

FRICTION STIR WELD SYSTEM FOR WELDING AND WELD REPAIR

CROSS-REFERENCES TO RELATED APPLICATIONS

This application claims the benefit of U.S. Provisional Application No. 60/111,418 filed Dec. 8, 1998.

ORIGIN OF THE INVENTION

This invention was made by an employee and a contractor of the United States Government and may be manufactured and used by or for the Government for governmental purposes without the payment of any royalties thereon or thereof.

BACKGROUND OF THE INVENTION

1. Field of the Invention

The invention relates to a friction stir welding apparatus comprising multiple sub-components which collectively perform as one integrated welding system allowing the apparatus to be operated and maintained in a variety of environments while permitting reduced size of the unit. The integrated nature of the sub-components gives the operator more flexibility in the type and size of workpiece that can be welded and effectively expands the utility of the friction stir welding process.

2. Description of Related Art

Friction stir welding is a method of welding based upon the principle of "rubbing" of articles to be joined together so as to generate a sufficient amount of heat. A probe of a harder material than the treated work pieces is typically applied in a welding process. The probe is subjected to cyclic movement relative to the work pieces. Merging the probe and work pieces together has been found to create a plasticized region in the work pieces due to generated frictional heat. When the relative cyclic movement of the probe stops, the plasticized material solidifies to create a weld joint.

The Friction Stir Weld (FSW) process, as it exists today, is believed to be limited to few manufacturing floors. Almost all known systems are restricted to laboratory/development environments. Development and laboratory equipment consists of large off-the-shelf machinery such as machining molds, modified to accommodate the FSW process. The large size of the laboratory equipment places size constraints upon manufacturing and tooling requirements, as a result, it is impractical and cost prohibitive to use machining mills for most manufacturing FSW applications. Additionally, the working envelope of the machining mills prohibits large pieces of hardware to be welded.

SUMMARY OF THE INVENTION

The present invention overcomes the disadvantages of the prior art devices in that large individual components may be replaced with sub-components attached or housed within a common base foundation unit to allow an operator to move the apparatus to the manufacturing floor where a greater range of devices can be operated on.

Accordingly, it is an object of this invention to provide a new and improved friction stir welding apparatus which permits the FSW procedure to be performed on the manufacturing floor, and in other environments that have traditionally been unavailable for use of FSW because of the size and lack of mobility of prior art FSW systems. This system may operate under loads exceeding 20,000 pounds. In addition to welding, the system can also operate as a precision controlled machining center by replacing the pin tool with an end mill/cutting tool.

An integrated welding system is taught herein which features multiple sub-components that are combined to create a self contained and mobile FSW apparatus. A base foundation unit (BFU) serves to either attach or house, or connect, other components. The BFU may be connected directly to a floor for a static welding environment or may be adopted to be mobile for dynamic weld environments. The BFU may accommodate significant axial and radial loads, estimated to be up to 20,000 lbs. or less axial and 2,000 lb. radial. An elevation platform (EP) may be movable in three dimensions and is connected to the BFU. An adjustable pin tool (APT) may be attached to the EP allowing the APT to be positioned in three dimensions. The APT may have movement independent of the EP such as rotational capabilities so it can be introduced into the weld joint at a pre-selected angle. A backplate tooling component may be attached to the exterior of the BFU to act as a backing bar during FSW weld operation. A fixturing component may be attached to the exterior of the BFU for holding and securing the workpiece during welding. A roller mechanism may be also attached to the exterior of the BFU and integrated with the APT to remove any bowing in the material before the joint is welded. Additionally, a real-time adaptive computer numerical control (CNC) and process control system (APCS) may be housed within the BFU. The APCS may be a digital computer system that incorporates common robotic position/motion control electronics and software. The APCS may also have electronics and software for monitoring the parameters of the FSW process. The APCS may analyze these parameters, and dynamically adapt the weld parameters to maintain weld performance.

In a preferred embodiment the integrated movement of the EP and the APT may be performed by hydraulics. The hydraulic system would preferably include a pump and fluid reservoir housed within the BFU. Hydraulic connections may be integrated with the EP and APT such that the operator can guide the pin tool to a desired position on the workpiece. Once the weld position is fixed, the APCS monitors the parameters of the FSW process, analyzes those parameters, and dynamically adapts the pin tool position to maintain weld performance.

Thus the friction stir weld (FSW) process as disclosed can be expanded to include a great variety of materials by integrating the individual components of large milling machines into a single integrated welding system. The process offers significant opportunities relative to costs, manufacturing, quality assurance, and health and safety standpoints for the welding of aluminum and other materials. Advantages of the process have been found to include: (1) a simple machine tool may be extremely energy efficient: a single pass 12.5 millimeter deep weld can be made in 6xxx series alloy using a gross power of less than 3 kW; (2) equipment maintenance has been found to be minimal; (3) the welding operation does not require consumable materials such as filler wire or shielding gas; (4) special pre-weld joint edge profiling may be eliminated; (5) the careful removal of oxide from the joint area immediately prior to the welding may not be required; (6) the equipment is suited for automation and integration with other machine tool operations; (7) good mechanical and metallurgical quality welds may be confidently made in aluminum alloys such as 2xxx, 5xxx and 7xx series which previously had problems such as solidification cracking and/or liquation cracking; (8) high joint strengths may be created in heat treatable alloys; (9)

welds may be consistently made which are free of voids and porosity; (10) metallurgical properties in the weld material may be retained such that mechanical and fatigue properties are similar to those of the parent metal; (11) butt and lap seam welds may be created between wrought, cast and extruded materials; (12) weld repeatability is very good when weld energy input and mechanical mechanisms direct and control the working and forging of the weld metal; (13) the welding machine may be simplified to three controls: tool heel plunge depths, tool rotation speed, and welding speed; (14) health hazards such as welding fumes or radiation are severely reduced if not eliminated resulting in a clean process; and (15) alloys other than aluminum may be utilized.

BRIEF DESCRIPTION OF THE DRAWINGS

Other aspects, objects and advantages of this invention will become apparent to those skilled in the art from the following description taken in conjunction with the following drawing, in which:

The FIGURE is a side elevational view of the friction weld stir weld system with interior portions shown in phantom.

DESCRIPTION OF THE PREFERRED EMBODIMENT

Referring to the FIGURE, a friction stir weld (FSW) system 10 according to the preferred embodiment of the invention is shown. The FSW system 10 comprises a base foundation unit (BFU) 12, an elevation platform (EP) 14, an adjustable pin tool (APT) 16 and a process control system 18. Additionally, the FSW system 10 may utilize backplate tooling illustrated as anvil 20, fixturing, illustrated as clamps 22, and a roller mechanism 24. The FSW system 10 may be utilized for welding and weld repairs such as initial welding and weld repairs to friction weld and fusion welds (TIG, MIG, VPPA, etc.). The FSW system may also be used as a machining center by replacing the APT with an end mill.

The base foundation unit 10 may be bolted directly into a floor to create a stationery welding environment. Alternatively, the BFU 10 may be connected to at least one mobile support 28. Mobile support 28 may comprise ways equipped with floor anchors 48 or any other suitable structure known in the art. Utilizing at least one mobile support 28, the FSW system 10 may be utilized to create dynamic weld environments. Accordingly, the BFU 10 may be mobile. The BFU 10 may at least partially house some of the hydraulics such as the pump and fluid reservoir 30. Additionally, the BFU 10 may house the process control system 18 which preferably comprises a real-time adaptive computer numerical control (CNC) 32 and process control system (APCS) 34. Hydraulic connections 36 may be utilized to connect the pump and fluid reservoir 30 to the elevation platform 14 and the adjustable pin 16.

The elevation platform 14 is preferably moveable at least along the N axis 38 which may be utilized at least partially in locating the adjustable pin tool 16 to a predetermined location. A portion of the elevation platform 14 may be housed within the base foundation unit 12. The movement of the EP 14 may allow the pin tool 16 to be centered into a weld joint 40 for welding. In addition to movement along the N axis 38, the elevation platform 14 may also exhibit three dimensional movement while capable of functioning under operating pressures. The movement of the elevation platform 14 may be necessary to attain proper pin tool 16 location with respect to the center of a weld joint 40. Three axis movement may be achieved through a variety of different mechanisms known in the art.

The elevation platform 14 may also pivot relative to at least a portion of the BFU 12. Pivot adjustments 56 and 58 may be utilized to assist in the positioning of the pin tool 16. Additionally, the position adjustment 60 may be utilized to control movement of the elevation platform 14 along the N axis 38. Furthermore, the process control system 18 may be utilized in conjunction with or completely replace any or all of the pivot adjustments 56, 58 and position adjustment 60, such as for some automated welding operations. Elevation platform 14 preferably exhibits three axes of movement capable of functioning under operating pressures. This movement has been found effective in attaining the proper pin tool 16 location respective to the center of the weld joint 40.

The adjustable pin tool (APT) 16 is preferably directly integrated into the EP 14. The APT 16 includes a probe which performs the friction stir welding process. The APT 16 preferably has rotational capabilities illustrated as pivoting housing 42 to allow the APT 16 to be introduced into the weld joint 40 at a preselected angle. The backing tool shown as anvil 20 may act as a backing bar during FSW weld operation. Additionally, fixturing such as clamps 22 may be utilized to hold a first and a second member 44, 46 to be utilized to hold and secure one or more work pieces during the welding process. Additionally, a roller mechanism 24 may be utilized in conjunction with the adjustable pin tool 16 to remove any bowing in the material before the joint 40 is welded. The roller mechanism 24 may preferably have two rollers 26 which may be positioned on either side of the weld joint 40.

The process control system 18 utilized within the FSW system 10 is preferably a digital computer system that incorporates common robotics positioning/motion control electronics and software. The APCS 34 may also have electronics and software for monitoring the parameters of the FSW process. Furthermore, the APCS 34 may also have electronics and software for analyzing the parameters of the FSW process and dynamically adapting the APCS 34 to maintain weld performance.

The FSW system 10 illustrated in the drawing shows the pin tool 16 acting along the N axis 38. In this embodiment, the N axis 38 is illustrated as being approximately 45 degrees to a horizontal surface. The N axis 38 is shown substantially perpendicular to a first surface 50 of the BFU 10. Alternatively, the N axis 38 could be located at other angles relative to the horizontal. Other embodiments could include the N axis 38 being substantially perpendicular to the second surface 52 or the third surface 54 of the BFU 12.

In a preferred embodiment, the BFU 12 accommodates the internal mechanical entities of various subsystems as described above. Additionally, the BFU 12 is preferably designed to operate under the radial and axial loads associated with the FSW process. The radial and axial loads are estimated to be 10,000 pounds or less axial and 2,000 pounds radial.

The positioning and control of the pin tool 16 is believed to be a unique feature of the FSW system 10. This FSW system 10 may be utilized for welding and weld repair on the manufacturing floor and/or a laboratory environment for a wide variety of welding and weld repair applications.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A friction stir weld apparatus comprising:
   a base foundation unit connected to at least one mobile support;
   an elevation platform connected to the base foundation unit, said elevation platform at least moveable along an axis relative to the base foundation unit;
   a pin tool having a stir welding probe, said pin tool moveable with the elevation platform; and
   a process control system in communication with the elevation platform and pin tool, said process control system monitoring at least one parameter related to said pin tool.

2. The friction stir weld apparatus of claim 1 wherein the process control system is further comprised of a real-time adaptive computer numerical control and process control system.

3. The friction stir weld apparatus of claim 1 further comprising a roller mechanism located proximate to a probe of the adjustable pin tool.

4. The friction stir weld apparatus of claim 3 wherein the roller mechanism comprises at least two rollers.

5. The friction stir weld apparatus of claim 1 wherein the pin tool is hydraulically activated.

6. The friction stir weld apparatus of claim 1 wherein the elevation platform is hydraulically operated.

7. The friction stir apparatus of claim 1 wherein the adjustable pin tool is adjustable relative to the elevation platform.

8. The friction stir weld apparatus of claim 1 wherein said elevation platform is moveable in three dimensions relative to the base foundation unit.

9. A friction stir welding system comprising:
   a base foundation unit connected to at least one mobile support;
   a moveable elevation platform at least partially housed within the base foundation unit in a first position;
   an adjustable pin tool moveable relative to the elevation platform and moveable with the elevation platform;
   back plate tooling located proximate the pin tool on an opposite side of a weld joint of at least one;
   fixturing capable of holding at least a portion of at least one item;
   a roller mechanism located proximate the pin tool on the pin tool side of the weld joint in contact with at least a second portion of said at least one item; and
   a process control system in communication with at least the elevation platform, said process control system monitoring at least one parameter related to said pin tool.

10. The friction stir welding system of claim 9 wherein the process control system further communicates with the pin tool.

11. The friction stir welding system of the claim 10 wherein the process control system further comprises a real-time adaptive computer numerical control in process control system.

12. The friction stir welding system of claim 9 wherein the elevation platform is hydraulically controlled.

13. The friction stir welding apparatus system of claim 9 wherein the adjustable pin tool is hydraulically controlled.

14. The friction stir weld system of claim 9 wherein the elevation platform exhibits three dimensional movement.

15. The friction stir weld system of claim 9 further comprising at least one mobile support connected to the base foundation unit.

* * * * *